United States Patent [19]

Mikawa et al.

[11] 3,912,476

[45] Oct. 14, 1975

[54] AIR SEPARATING APPARATUS

[75] Inventors: Hiroji Mikawa; Yomei Kato, both of Hitachi; Kiyoshi Sasaki, Kudamatsu, all of Japan

[73] Assignee: Hitachi, Ltd., Japan

[22] Filed: Apr. 19, 1974

[21] Appl. No.: 462,542

[30] Foreign Application Priority Data
Apr. 20, 1973 Japan................................ 48-24539

[52] U.S. Cl. ........................................ 62/37; 62/21
[51] Int. Cl.[2] ............................................. F25J 3/00
[58] Field of Search ........................... 62/21, 37, 39; 203/DIG. 18; 202/160, 181; 208/DIG. 1; 235/151.12; 196/132

[56] References Cited
UNITED STATES PATENTS

| | | | |
|---|---|---|---|
| 3,062,016 | 11/1962 | Dennis et al. | 62/29 |
| 3,210,950 | 10/1965 | Lady | 62/21 |
| 3,296,097 | 1/1967 | Lupfer | 202/160 |
| 3,363,427 | 1/1968 | Blanchard et al. | 62/21 |
| 3,420,748 | 1/1969 | Johnson et al. | 202/160 |
| 3,428,528 | 2/1969 | Oglesby et al. | 202/160 |
| 3,449,215 | 6/1969 | Johnson et al. | 202/160 |
| 3,600,282 | 8/1971 | Lupfer et al. | 202/160 |
| 3,748,448 | 7/1973 | Sayles et al. | 208/DIG. 1 |
| 3,793,157 | 2/1974 | Hobbs et al. | 203/DIG. 18 |
| 3,815,376 | 6/1974 | Lofredo et al. | 62/39 |

Primary Examiner—Norman Yudkoff
Assistant Examiner—Frank Sever
Attorney, Agent, or Firm—Craig & Antonelli

[57] ABSTRACT

There are employed reversible heat exchangers for effecting heat exchange between the crude air introduced in the apparatus and the product oxygen and introgen so as to cool the crude air thus introduced, said reversible heat exchanger being adapted to be switched therebetween at a given cycle. The crude air thus cooled is introduced in a rectifying tower for separating product oxygen therefrom.

A plurality of minor control systems are operated independently of one another for controlling: a quantity of crude air to be introduced in the apparatus; a quantity of crude air to be introduced in an upper section or rectifying tower, out of the crude air thus introduced and cooled; a flow rate of nitrogen to be circulated from the lower tower of rectifying tower to the upper section; a liquid level of liquid air in the lower section of rectifying tower, and a flow rate of product oxygen, respectively. A target value of respective minor control system is given by calculations which are effected, by means of a separately provided computor, for maintaining constant a ratio in flow rate of the downwardly moving liquid to the upwardly moving vapor within the upper and lower tower of rectifying tower, respectively.

3 Claims, 5 Drawing Figures

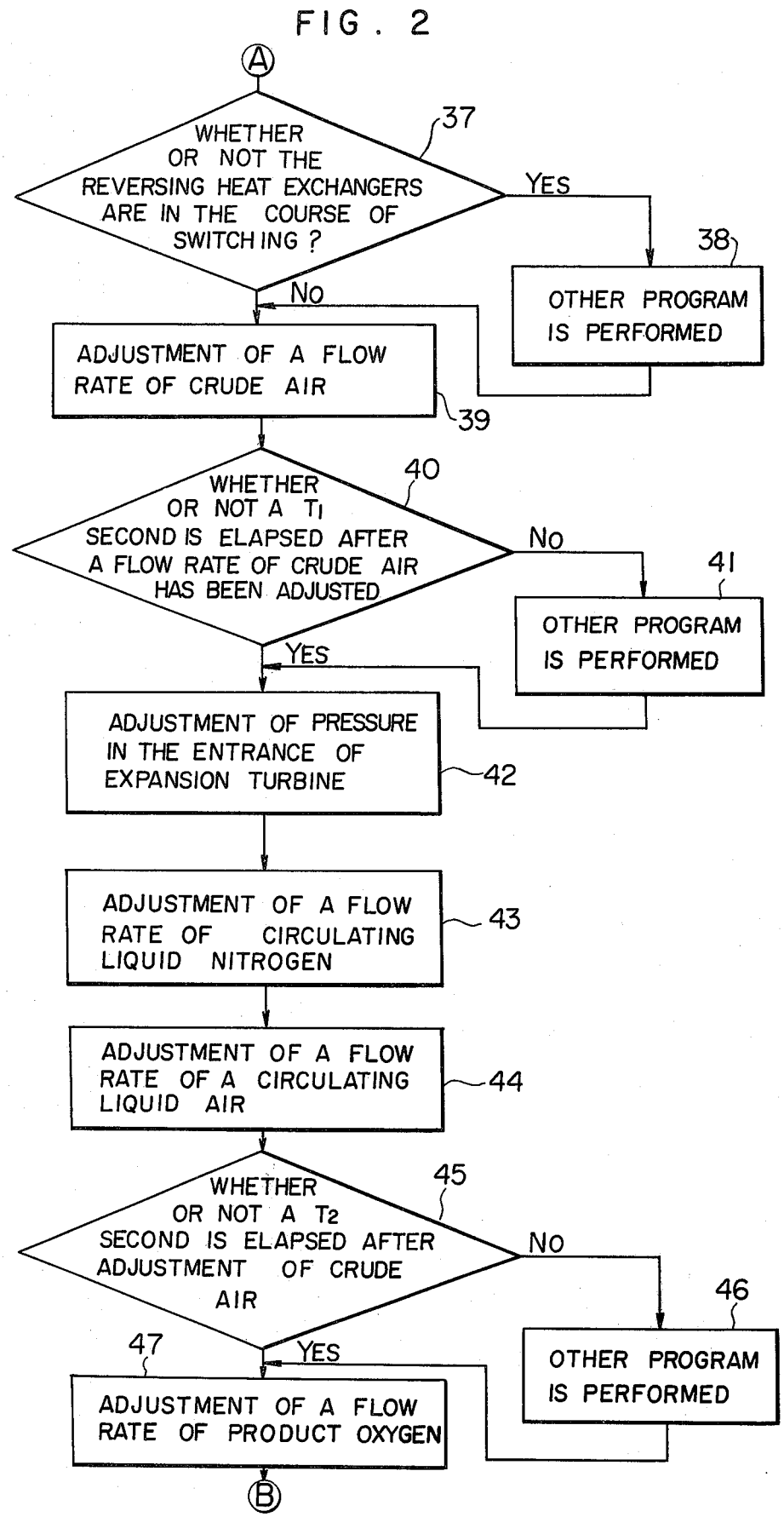

AIR SEPARATING APPARATUS

BACKGROUND OF THE INVENTION

This invention relates to an air separating apparatus utilizing a liquefying reaction of gases, and more particularly to an air separating apparatus, wherein a quantity of oxygen gas to be produced or other gases to be produced may be varied for a short period of time, with its purity being maintained to a given level.

As is well known, in an air separating apparatus utilizing a liquefying reaction of gases, in order that the purity of product gases is maintained stable, it is imperative to stabilize the running condition of the rectifying tower. Since there takes place shifting of materials between the downwardly moving liquid and the upwardly moving vapor within the rectifying tower, it is necessary to maintain a ratio of flow rate of the downwardly moving liquid to that of the upwardly moving vapor, so as to stabilize the running condition in the rectifying tower.

Accordingly, it is apparent that, where a quantity of product gas to be produced is desired to be increased, respective working sections of the air separating apparatus should be operated in accordance with given procedures, without causing variation in the aforesaid ratio in flow rate of the liquid to the vapor. It is however difficult, as a matter of fact, to directly detect and control a ratio in flow rate of the the liquid to the vapor. Furthermore, because the air separating apparatus itself has a large time constant with respect to change in respective working sections, the procedure for driving the apparatus is rather complicated.

On the other hand, most of the air separating apparatus is employed as an apparatus for supplying crude air to other apparatus in a large scale of a plant, rather than as an independent apparatus. For example, the air separating apparatus is employed as a crude oxygen supply device in a chemical plant, and as an oxygen supply apparatus in an iron mill. In the aforedescribed examples, a quantity of oxygen to be produced is determined according to the running condition of the plant in which the air separating apparatus is provided, and the air separating apparatus is required to produce an amount of oxygen required, according to the running condition of the plant.

In case a quantity of product gases to be produced is changed to meet the requirement, the aforedescribed difficulties will result. Accordingly, it is difficult to detect the decrease in the purity of product gases in an early stage which results from an improper operation, and it takes a long time to recover the lowered purity to a given level. This adversely affects on the function of the plant utilizing oxygen, and hence the decrease in purity of the oxygen produced should be avoided.

To avoid the decrease in the purity of oxygen produced, the method has been hitherto attempted, in which a sufficiently large size product-gas storing tank is provided and the running schedule of the air separating apparatus is programmed in accordance with the running schedule of the plant so that the air separating apparatus may be driven independently of the running condition at the plant. Another method has been such that a quantity of crude air to be introduced in the apparatus is increased excessively over that required for a quantity of increment of product gases to be increased, so that the apparatus is driven in a manner not to cause the lowering in purity of product gases, or otherwise, a quantity of crude air to be charged is alternatively increased prior to the increase in a quantity of product gases, so that the apparatus may be driven so as to increase a quantity of product gases, without causing the decrease in the purity of product gases. (Where a quantity of gases produced is desired to be decreased, the running method of the apparatus will be reversed.)

The above-described methods ensure supply of a required quantity of product gases according to the running condition of the plant, but are disadvantageous from the viewpoint of economy. The former method requires a huge storing equipment, in addition to the air separating apparatus, while the latter method incurs a greatly increased running cost for providing energy necessary for producing gases per elemental unit (1N m$^3$/h), i.e. for producing product gases. In those methods, operators must usually pay their attention to whether or not the operation is effected properly, with the accompanied mental fatigue.

SUMMARY OF THE INVENTION

It is accordingly an object of the present invention to provide an air separating apparatus, wherein no storing tank is provided, and an operator is only requested to indicate a required amount of gases to be produced, whereby after lapse of a given time, a required amount of product gases is obtained.

Another object of the present invention is to provide an air separating apparatus, which is free of increase in running cost due to an inadvertent operation.

These and other objects and features of the present invention will be more apparent from the ensuring part of the specification in conjunction with drawings which indicate a preferred embodiment of the invention.

The present invention has been made in view of the fact that to maintain purity of product gases in a given level, it is imperative to maintain constant a ratio in flow rate of the liquid to the steam within a rectifying tower; conversely, so far as a ratio in flow rate of the liquid to the vapor within the rectifying tower is maintained constant, the purity of product gases is maintained in a given level. Thus, according to the present invention, there is provided an air separating apparatus which comprises a plurality of minor control systems for controlling respective working sections, and a major or over-all control device separately provided from the aforesaid minor control systems for giving to respective control systems an information of a target value of respective minor control system which is required to maintain constant the aforesaid ratio in flow rate of the liquid to the steam within the tower. The major control device is fed with measurement signals of flow rates and pressure of crude air, etc., a required amount of gases produced, and constants necessary for performing an arithmetic operation in consideration of material balance and heat balance at the time of the liquefying reaction within the rectifying tower, or the like.

BRIEF DESCRIPTION OF THE DRAWINGS

FIG. 2 is a flow sheet illustrating procedures for operating respective working sections of an air separating apparatus;

DETAILED DESCRIPTION OF THE INVENTION

Figure 1:
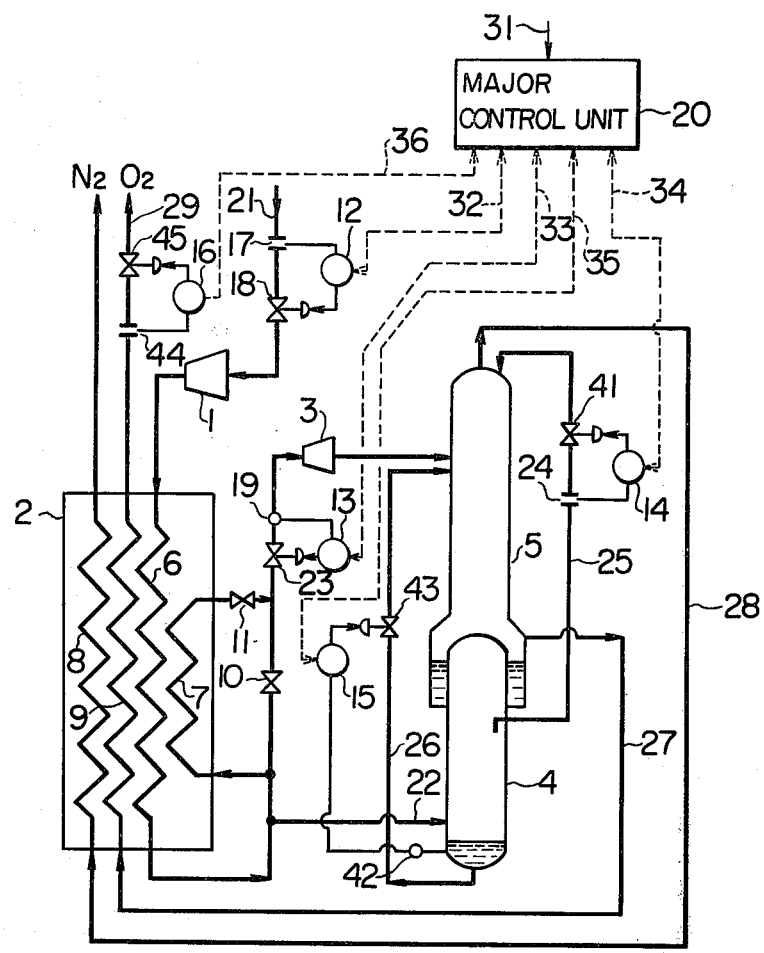
FIG. 1 is a block diagram showing an embodiment of the present invention.

As set forth in the foregoing, for increasing a quantity of gases produced, with the purity of product gases being maintained to a given level, respective working sections should be operated with a ratio in flow rate of the liquid to the vapor within a rectifying tower being maintained constant. In order to increase a quantity of product gases, without causing variation in the aforesaid ratio in flow rate of the liquid to the vapor within the tower, in consideration of material balance and heat balance within the rectifying tower, at least respective flow rates given under the following four items need be duly controlled:

1. a flow rate of crude air to be introduced in the air separating apparatus;
2. a flow rate of crude air to be introduced in the upper tower of rectifying tower, out of crude air which has been introduced in the air separating apparatus;
3. a flow rate of liquid nitrogen to be circulated from the lower tower of rectifying tower to the upper tower thereof; and
4. a flow rate of product gases.

For providing the more stable and precise control, the following should preferably be controlled:

5. a flow rate of liquid air to be circulated from the lower tower of rectifying tower to the upper tower thereof.

In the embodiment illustrated, control for the above-described five items is achieved by means of the below-mentioned minor control systems. A flow rate of crude air to be introduced in the air separating apparatus is controlled by the opening degree of a valve provided in a crude air passage, which opening degree is determined by comparison of a target value of a flow rate of crude air with an actual measurement thereof. A flow rate of crude air to be introduced to the upper tower of rectifying tower is controlled by the opening degree of a valve provided in a crude air passage, which degree is determined by comparison between a target value of pressure in the entrance of expansion turbine provided in a crude air passage and an actual measurement thereof. A flow rate of liquid nitrogen to be circulated is controlled by the opening degree of a valve provided in a passage, which degree is determined by comparison of a target value of a flow rate of liquid nitrogen to be circulated, with an actual measurement thereof. A flow rate of product gases is controlled by the opening degree of a valve provided in a passage, which degree is determined by comparison of a target value of product gases with an actual measurement thereof. A flow rate of liquid air to be circulated is controlled according to a signal which controls the opening degree of a valve provided in a passage by comparing an actual measurement with the target value for the liquid level in the bottom portion of the lower tower, said signal being compensated for commensurate to the flow rate of a circulating liquid air.

Actual measurements obtained and other factors required for respective minor control systems are introduced in a major or over-all control device. The major control device performs an arithetic operation of material balance and heat balance in the rectifying tower in accordance with pre-determined formulae, and their results are given to respective minor control systems as a target value and signals compensated.

Description will hereunder be given to the embodiment, with reference to FIGS. 1, 2 and 3, wherein product gases are assumed as oxygen. FIG. 1 is a block diagram of an air separating apparatus commonly used, to which the present invention is applied and which comprises an air compressor 1, a reversing heat exchanger 2 (or a regenerator may be used.), an expansion turbine 3 and a rectifying tower (consisting of a lower section 4 and an upper section 5). Crude air is compressed in the air compressor 1 to a given level of pressure, and fed, past a filter (not shown) to remove therefrom dust or water soluble gases contained therein, into the reversing heat exchanger 2. The crude air thus introduced is subject to heat exchange with the separated gases of low temperature, whereby the crude air is cooled and impurity contained therein, such as moisture and carbon dioxide, is condensed. A major part of the crude air of low temperature, whose impurity has been removed therefrom, is introduced in the lower section 4 of rectifying tower, while the remaining part of air is streamed, partly via a re-heating circuit 7, into the expansion turbine 3. The crude air is subject to adiabatic expansion in the expansion turbine and its temperature becomes lowered due to Joule-Thomson effect, then the low temperature crude air is fed to the upper section 5 of rectifying tower. The major part of crude air is fed by way of a pipe 22 to the lower section 4, from which circulating liquid nitrogen is transferred by way of a pipe 25 and the circulating liquid air is transferred by way of a pipe 26 to the upper tower 5, respectively. The crude air is separated into nitrogen and oxygen in the upper section 5. The nitrogen $N_2$ thus separated is streamed out from the top of upper section 5 so as to be introduced by way of a pipe 28 to the reversing heat exchanger 2. The oxygen $O_2$ thus separated is streamed out from the bottom of upper section 5 and introduced by way of a pipe 27 into the reversing heat exchanger 2. In the reversing heat exchanger 2, cold is transferred by way of heat transfer pipes 8 and 9 to a crude air pipe 6. The impurity contained in the condensed crude air is sublimated mainly with nitrogen separated from air for permitting the reversing heat exchanger to run for a long period of time, and to this end, air passages will be switched at a given interval of time between the reversing heat exchanger and the other reversing heat exchanger (not shown).

Now, reference is made to a plant of FIG. 1 from the viewpoint of maintainance of oxygen purity. If a quantity of crude air to be introduced in the compressor 1 is increased by enlarging the size of the opening of the entrance of compressor 1, without causing increase in a quantity of oxygen to be streamed out through the pipe 27, there necessarily results increase in a quantity of oxygen to be introduced in the plant. Accordingly, if the air separation function or rectifying function in the rectifying tower is assumed to be remained unchanged as compared with the case before crude air to be introduced is increased, then, purity of oxygen obtained from the pipe 27 will naturally increase. This is a basic notion that an amount of crude air should be changed before an amount of oxygen is increased, as set forth in the foregoing. The method, however, is accompanied by increase in loss of oxygen due to the admixing thereof into nitrogen passing through a pipe 28, resulting in increase in the cost of running the plant.

For reducing oxygen loss, it is imperative to control the apparatus itself comprehensively, in consideration of material balance and heat balance in the plant. The present invention contemplates to achieving the optimum control of the air separating apparatus, wherein the arithmetic operation for controlling the over-all apparatus is performed by a major or over-all control device, while controls for respective working sections are effected by minor control systems which operate independently from one another in response to signals given by the major control device. The apparatus according to the embodiment shown comprises three minor control systems for controlling a flow rate, a minor control system for controlling liquid level, a monor control system for controlling pressure, and a major or over-all control device for performing operation of material balance and heat balance in accordance with an amount of oxygen required and an actual measurement in those minor control systems. The crude air to be introduced through a pipe 21 is adjusted to a given flow rate by a minor control system consisting of a flow meter 17, a control valve 18 and a regulator 12. Respective minor control system will hereinafter be represented by reference numeral of a regulator. The temperature in the entrance of expansion turbine 3 is determined depending upon a ratio in opening of the valve 10 to the valve 11, which ratio in opening degree of the valve 10 to the valve 11 is preliminarily fixed to a given ratio. A flow rate of crude air passing through the expansion turbine 3 and the rate of cold produced in the expansion turbine 3 are adjusted by a minor control system 13 consisting of a pressure gauge 19, a control valve 23 and a regulator 13. Flow rates of liquid nitrogen and liquid air, which circulate from the lower section 4 by way of pipes 25 and 26 to the upper section 5, are controlled by a flow-rate minor control system 14 consisting of a flow meter 24, a control valve 41 and a regulator 14 and by a liquid-level minor control system 15 consisting of a liquid level indicator 42, a control valve 43 and a regulator 15, respectively. Oxygen separated from air in the upper section 5 is controlled to a given flow rate by a flow-rate minor control system 16 consisting of a flow meter 44, a control valve 45 and a regulator 16 and then supplied by way of a pipe 29 to other plant. Respective minor control systems described are connected through signal lines shown by broken lines, to the major or over-all control device 20. Actual measurements or other values measured in respective minor control systems are transmitted to the major control device, while target values, etc. for respective control systems which are obtained through the arithmetic operation performed in the major control device are transmitted to respective minor control systems.

Before description is given to the controlling method for maintaining in a given level a ratio in flow rate of the liquid to the vapor within the rectifying tower, for automatically producing a required quantity of oxygen of a given purity, respective minor control systems will be briefly referred to, with reference to FIG. 3.

Figure 3A:
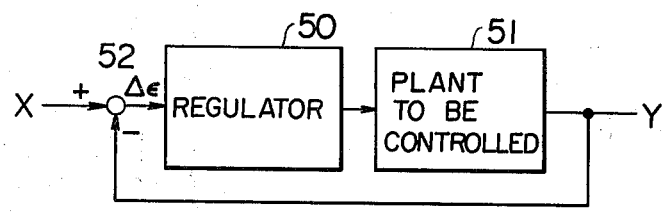
FIGS. 3($a$) and 3($b$) are block diagrams showing a construction of a minor control system adapted for the present invention, respectively; and, FIG. 4 shows plots of a characteristic of respective flow rate in respective working sections, shown for the purpose of explaining results brought about by the present invention.
Figure 3B:
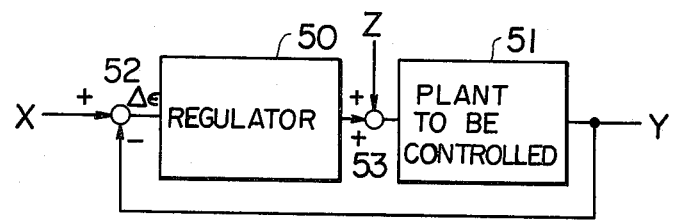

FIGS. 3A and 3B are block diagrams illustrating two different type of automatic control systems, respectively, wherein shown at 50 is a regulator involving an integral element, at 51 a plant to be controlled, and at 52 and 53 points at which signal are added. At these points, signals having polarities shown in the drawing are given to the regulator. Both control systems function basically in the same manner that an amount to be controlled Y is negatively fed back to a target value X, so that deviation $\Delta \epsilon$ between both values will become zero, with the exception that the control system of FIG. 3B undergoes influence of a compensation signal Z. That is to say, if $Z = 0$, then FIGS. 3A and 3B are quite the same. If $Z \neq 0$, then the plant 51 to be controlled in the control system in FIG. 3B is compensated for by the signal Z in the process of control. Even if $Z \neq 0$, the control systems in both FIGS. 3A and 3B are quite the same in the point that when the plant is brought into the normal condition after lapse of a long period of time, then $X = Y$. On the other hand, the plant 51, when in the process in which Z changes, will be subject to control due to Z, even if $X = Y$.

In the embodiment shown, the minor control systems 12, 13, 14 and 16 are of the type shown in FIG. 3A, respectively, such that the target value X varies according to signals fed through signal lines 32, 33, 34 and 36. The minor control system 15 alone is of the type shown in FIG. 3B, such that the compensation signal Z may change according to signals given through the signal line 35. Accordingly, from the long-run point of view, the liquid air circulating through the pipe 26 is controlled in a manner to render its liquid level constant.

FIG. 2 shows the procedures of operation which are performed in the major control device 20, and in case a computer for control is used, the procedures will become a controlling program.

Suppose that there is fed a requirement for increasing a quantity of product oxygen to be produced to $\delta$ times as much as the usual quantity. Then, it is confirmed in a step 37 whether or not the reversing heat exchanger 2 is in the course of switching. If the reversing heat exchanger 2 is in the course of switching, then the other program will be carried out in a step 38. Upon completion of the switching in the reversing heat exchanger 2, a flow rate of crude air is determined in a step 39. Since the crude air contains therein oxygen of 20 percent, if oxygen contained in the crude air is supposed to be wholly separated therefrom, if should suffice to increase a flow rate of crude air by $5 \times (\delta - 1)$ as much as a quantity of product oxygen in a stage where no change is given to a quantity of crude air to be fed. However, practically it is difficult to separate all of oxygen contained in the crude air therefrom, and hence a flow rate of crude air should be increased to a value more than $5 \times (\delta - 1)$. Therefore, a flow rate of crude air is determined by the following formula:

$$F_{al} = F_{ao} + O_{20} \times 5 \times (\delta - 1) \times K \tag{1}$$

wherein $F_{al}$ is a flow rate of crude air (Nm³/h) after regulation, $F_{ao}$ is a flow rate of crude air (Nm³/h) prior to regulation, $O_{20}$ is a flow rate of product oxygen (Nm³/h), and K is a coefficient of compensation (usually 1.2 or thereabout). The value obtained by the formula (1) is fed via the signal line 32 to the minor control system 12 so that the target value of the control system 12 varies from $F_{al}$, thereby adjusting the crude air to be introduced through the pipe 21 to a given flow rate. It takes a $T_1$ second since opening of the valve 18 is changed until a flow rate of crude air comes to be stabilized. This is confirmed in a step 40, during which the other program is carried out in a step 41. After lapse of a $T_1$ second, a step 42 follows.

As is well known, where it is desired to change a flow rate of crude air according to the requirement for changing a quantity of oxygen produced, it is most suitable, from the viewpoint of balance in the over-all flow rate of crude air, to take the method in which a ratio in flow rate of the crude air in the upper section 5 to the crude air in the lower section 4 makes equal in respective stages before and after variation is given thereto. Since a flow rate of crude air to be fed in the upper tower 5 from the expansion turbine 3 is substantially proportional to the pressure in the entrance of turbine, the pressure in the entrance of turbine is determined in the step 42 by the following formula:

$$P_1 = P_o + P_o \times (\delta - 1) \times K \quad (2)$$

wherein, $P_1$ is a pressure in the entrance of expansion turbine after regulation (kg/cm² G), $P_o$ is a pressure in the entrance of expansion turbine prior to regulation (kg/cm² G), and K is a coefficient of compensation (usually 1.0). The value obtained by the formula (2) is fed via the signal line 33 to the minor control system 13, such that the target value of the control system may be changed from $P_o$ to $P_1$, thereby adjusting the pressure in the entrance of turbine to a given level. Thus, a ratio in flow rate of crude air between in the upper section 5 and in the lower section 4 will be maintained constant. In a step 43, a flow rate of circulating liquid nitrogen is determined. If a flow rate of crude air increases, then a ratio in flow rate, of crude air in the lower section 4 increases, and hence the oxygen purity in the tower will be lowered. For this reason, a flow rate of nitrogen circulating through the pipe 25 is increased, so that a flow rate of liquid nitrogen moving downwards within the tower may decrease for maintaining constant a ratio in flow rate of the liquid to the vapor therein, and thus, oxygen purity in the tower will be controlled to a constant level. Accordingly, in the step 43, a flow rate of liquid nitrogen circulating through the pipe 25 is determined by the following formula:

$$LN_1 = LN_o + LN_o \times (\delta - 1) \times K \quad (3)$$

wherein, $LN_1$ is a flow rate of circulating liquid nitrogen after regulation (Nm³/h), $LN_o$ is a flow rate of circulating liquid nitrogen prior to regulation (Nm³/h) and K is a coefficient of compensation (usually 1.0). The value obtained by the formula (3) is fed by way of the signal line 34 to the control system 14, thereby adjusting a flow rate of circulating liquid nitrogen. In a step 44, a flow rate of circulating liquid air is determined. The outputs produced in the step 44 are introduced in the regulator 15 included in the liquid-level minor control system. The regulator 15 used is, for example, a PID regulator, and for avoiding the influence due to the switching of the reversible heat exchanger 2 it is one of the most efficient measures to employ a sampling regulating method, which is disclosed in the Patent Application No. 46-80,148 (1971) filed by same applicant and in which control outputs are produced by sampling in synchronism with the switching cycle of the reversible heat exchanger 2. Since the minor control system 15 is a control system which controls the level of liquid air to a constant level, rather than changes the target value of the system, then a flow rate of circulating liquid air is adjusted according to signals which compensate for outputs of the regulator by the following formula:

$$C_1 = C_0 + C_o \times (\delta - 1) \times K \quad (4)$$

wherein $C_1$ is outputs produced from the regulator after regulation, $C_o$ is outputs produced from the regulator prior to regulation, and K is a constant of compensation (usually 1.0).

The value obtained by the formula (4) is fed by way of the signal line 35 shown in FIG. 1 to the regulator 15, thereby compensating for outputs from the regulator 15. It takes a $T_2$ second that respective minor control systems 13, 14 and 15 are actuated according to the values obtained by the formulae (2), (3) and (4) and control amounts in respective control systems come to stabilize. Such a period of time is confirmed in a step 45, during which the other program is carried out in a step 46, and after lapse of a $T_2$ second, a step 47 follows. By the step 47, respective flow rate and pressure have been adjusted to a given value by the control systems 12, 13, 14 and 15. Thus, in the step 47, there are produced signals for increasing a flow rate of oxygen to $\delta$ times, such that the target value of a flow rate of product oxygen in the minor control system 16 will be increased according to the signals fed thereto through the signal line 36 shown in FIG. 1. Thus, operation of the major control device 20 completes.

Figure 4:
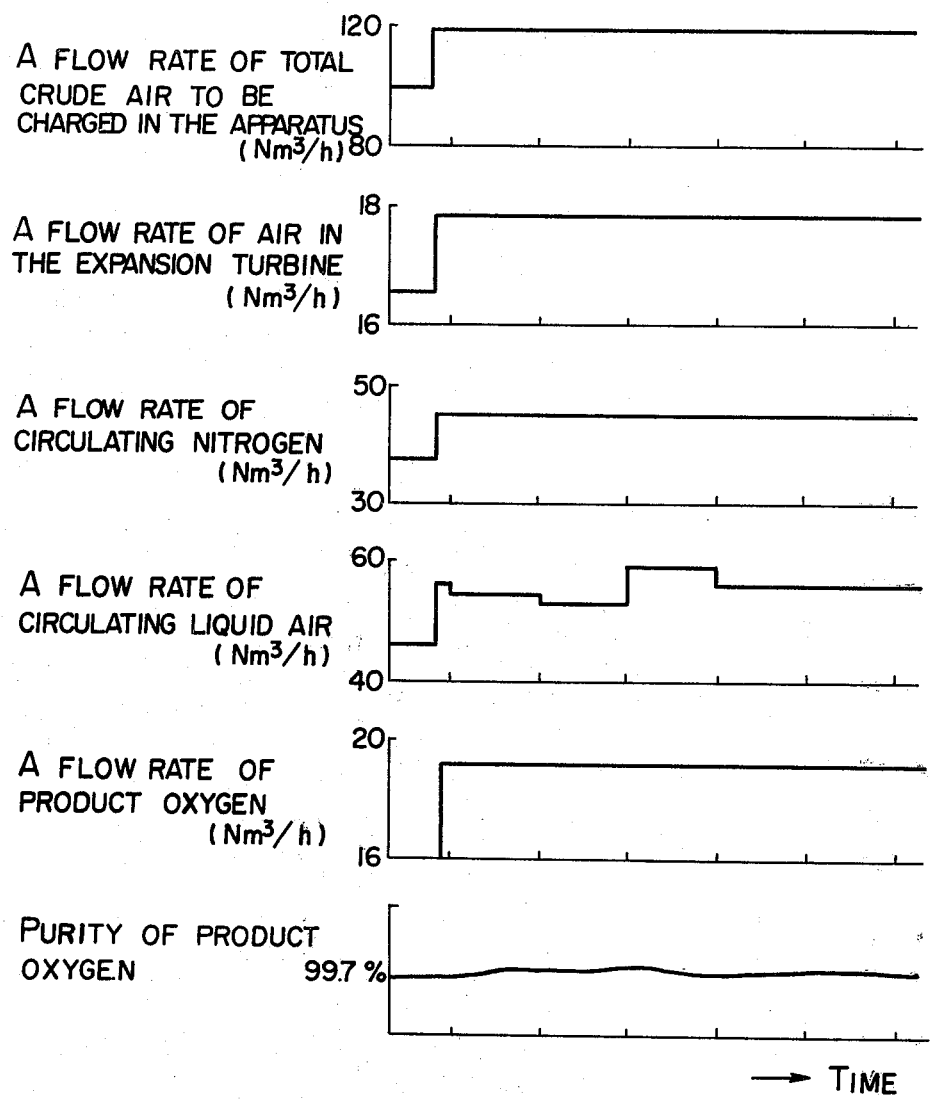

According to the present invention, owing to the above-described series of arithmetic operations, a quantity of oxygen to be produced is rapidly increased without causing the lowering in purity of product oxygen, which will be more apparent from the results of test as shown below. After the air separating apparatus has been brought into a normal state under a given test condition, a quantity of product oxygen to be produced is increased by 20 percent in a stepped fashion. The characteristic of respective flow rate and purity is given in FIG. 4. In the drawing, graduations given at a constant cycle onto respective axis representing time show a timing of switching the reversible heat exchanger 2. In the regulator 15 used in the test, there was employed the afore-described sampling regulating method, in which for feeding as inputs the actual measurement to the regulator, such actual measurement was subject to sampling in synchronism with the cycle of switching the reversible heat exchanger 2.

As is apparent from the foregoing, the present invention brings about the following advantages:

1. a quantity of product oxygen is rapidly increased, with its purity being maintained to a level higher than a specified value, 2. As a result of the item (1), there is avoided a necessity to give a temporary output restriction to other plants or necessity of producing product gases of an excessive quantity for reservation purposes, with the result of improvement in operational yield in the air separating apparatus;

3. As a result of the item (1), reduction in size of equipments such as a product-gas storing tank, etc. is permitted, and no tank is necessary as the case may be;

4. The air separating apparatus is automated. This contributes to avoiding the lowering in product gas purity due to wrong operation as well as relieving operators of their mental fatigue.

For ensuring production of gases of a given purity, the sixth sense of the skilled operator may be sufficiently variable, because, for producing product gas of a given purity, the skilled operator starts changing a flow rate of crude air to be introduced in the apparatus and then performs step by step the other procedures succeding thereto. Such a method, however, involves a feasibility that excessively high purity gases may be produced, with the accompanying increase in production cost, or a risk that purity of gases produced is lowered to a level lower than a specified value. While, according to the present invention, the air separating apparatus is maintained in the optimum running condition by the major control device, so that a required quantity of gases of an optimum purity is supplied to the other plants, whenever required.

According to the present invention, to maintain constant a ratio in flow rate of the liquid to the steam in the rectifying tower, material balance and heat balance are calculated based on the process variables such as respective flow rate, pressure and liquid level, and the apparatus is driven under a feed-forward control. Accordingly, the present invention may be applied to the apparatus of the type which comprises the rectifying tower consisting of the upper and lower towers equipped with other by-path passages or other feeding points (for example, an argon tower is added thereto, or passages for circulating air which lead from the lower tower to the upper tower are added thereto.). In such a case, an arithmetic operation will be performed in a step following the step 43 shown in FIG. 2, and the formulae used are the same as the formulae (1) through (4). The minor control systems 12, 13, 14, 15 and 16 shown in FIG. 1 may be of the analogue type utilizing a PID regulator, or may be of the DDC type (degital direct control type) resorting to a computer. It is obvious that the present invention is available independently of the type of control device used. In respective minor control systems, the fact that respective flow rate, pressure and opening of respective valve are in a fixed relation to one another is utilized so that calculation may be effected using the opening degree of a valve as a target value, so as to bring the opening degree of respective valve in coincidence with the value obtained by calculation, rather than assuming the pressure itself as an target value.

What is claimed is:

1. An air separating apparatus comprising:
    a rectifying tower having an upper section and a lower section, inlet means for introducing crude air into the lower section of said rectifying tower, outlet means for discharging product gases from the upper section of the rectifying tower; first conduit means extending from the lower section of the rectifying tower for directing liquid $N_2$ into the upper section of the rectifying tower, and second conduit means for directing liquid air from the lower section of the rectifying tower to the upper section of the rectifying tower;
    a first minor control system for controlling a flow rate of a quantity of crude air introduced into the apparatus;
    a first means for cooling the crude air thus introduced;
    a second means for introducing at least a portion of the crude air thus cooled into the lower section of the rectifying tower;
    a third means for introducing another portion of the crude air cooled by said first means into the upper section of the rectifying tower, said third means including at least an expansion turbine;
    a second minor control system for controlling pressure of the crude air at the entrance of said expansion turbine;
    a third minor control system for controlling a rate of flow of nitrogen within said first conduit means from said lower section of said rectifying tower to the upper section of said rectifying tower;
    a fourth minor control system for controlling a liquid level of liquid air in said lower section of the rectifying tower, said fourth minor control system including means for controlling passage of liquid air within said second conduit means from said lower section of the rectifying tower to the upper section of said rectifying tower;
    a fifth minor control system controlling a flow rate of product gases discharged from the upper section of the rectifying tower;
    said minor control systems each generating an information signal representing a measurement of the process variable controlled by each of said minor control systems; and
    a major control system to which information signals from at least the first, second, third and fifth minor control systems are transmitted as inputs together with signals of a desired quantity of product gases needed for a given demand as inputs, said major control system producing, in response to the information signals and the signals of a required quantity of product gases, target value signals for said first, second, third and fifth minor control systems which are required for maintaining a ratio between the flow rate of a downwardly moving liquid and an upwardly moving vapor within said rectifying tower constant; and
    said respective minor control systems each regulating the process variable controlled to correspond to said target value signals.

2. An air separating apparatus as defined in claim 1, wherein an interval of a given period of time is intervened between the two steps for performing an arithmetic operation for providing target value signals for said first and second minor control systems, and between twp steps for performing an arithmetic operation for providing target value signals for said third and fifth minor control systems, respectively.

3. An air separating apparatus as defined in claim 1, wherein an information signal from said fourth minor control system is introduced into said major control system, whereby signals for compensating for a target value signal for said fourth minor control system are produced, following the step for producing a target value signal for said third minor control system, said signals for compensating for the target value signals being employed for compensating for outputs produced from a regulator of said fourth minor control system.

* * * * *